March 7, 1939.  C. CROSTHWAITE  2,149,668
CHANGE-SPEED GEARING
Filed Dec. 10, 1936
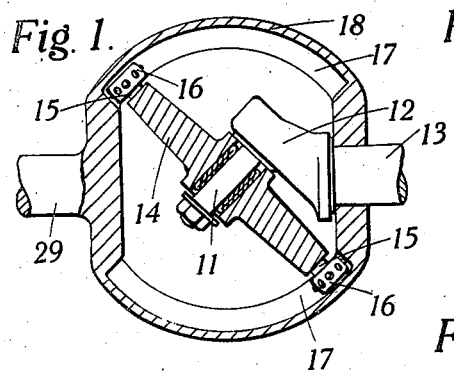
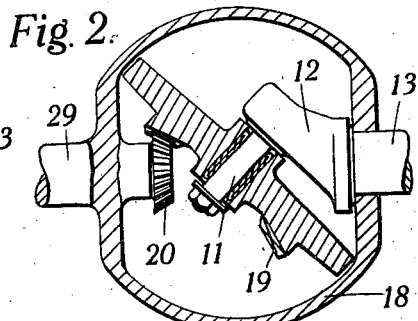
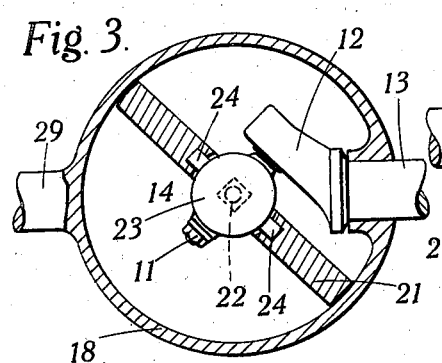
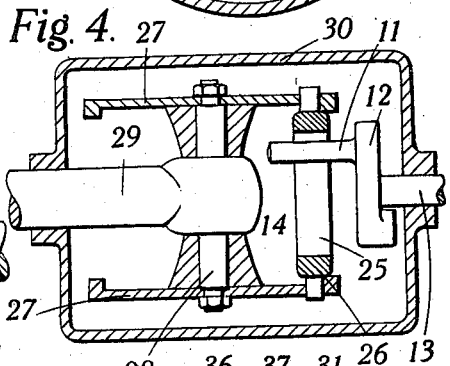
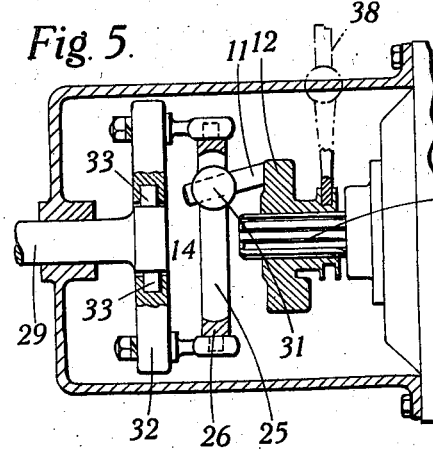
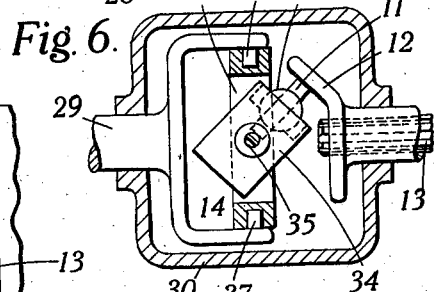
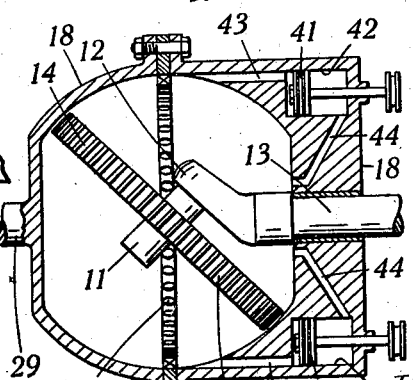
Inventor
Cedric Crosthwaite
by Mawhinney & Mawhinney
Attorneys.

Patented Mar. 7, 1939

2,149,668

UNITED STATES PATENT OFFICE 2,149,668

CHANGE-SPEED GEARING

Cedric Crosthwaite, Darlington, England

Application December 10, 1936, Serial No. 115,215
In Great Britain December 10, 1935

2 Claims. (Cl. 74—60)

This invention relates to change-speed gearing (for motor-vehicles, for example) of the inertia type, and my object is to provide a very simple form of inertia gearing which will give a variable speed reduction dependent upon the load on the driven shaft and the speed of the driving shaft.

Broadly speaking, the change-speed gearing includes a crank-pin on a shaft, a member co-axial with the shaft, and an intermediate member which is engaged with the crank-pin and the co-axial member and is oscillated with respect to the latter when the driving member (which may be the crank-pin or the co-axial member) is rotated and the driven member is held, and which rotates without any such oscillation when the driving member and the driven member are rotating in unison.

The seven figures of the accompanying drawing are part-sectional elevations of different embodiments of the invention, Figures 1 to 3 showing preferred constructions. (These figures, however, are given solely by way of example.) Like numerals are used throughout the drawing to denote similar parts.

In the accompanying drawing, and particularly in Figure 1, the crank-pin 11 and crank 12 are co-planar with but inclined to the shaft 13, for example, at an angle of forty-five degrees, the centre of the crank-pin lying on the axis of the shaft. Journalled on the crank-pin is the intermediate member 14, a disc spherical or other member of suitable weight and with two projections 15, 15 which are engaged (for example, through ball bearing rings 16) in diametrically-opposite longitudinal slots 17 in the co-axial member aforesaid, here shown as a shell 18 which is co-axial with and may be journalled on the shaft 13.

If the shell be the driving member and the shaft 13 be held, the projections 15 of the intermediate member will be oscillated to-and-fro along the slots in the shell. If the shell be rotated at a sufficient speed relatively to the load on the shaft 13, the inertia of the intermediate member will cause the shaft 13 to revolve, thus to lessen the oscillation of the intermediate member with respect to the shell. When the shaft 13 is revolving at the speed of the shell the intermediate member is revolving in unison therewith without any oscillation.

Obviously, if desired, the shaft 13 may be the driver and the shell the driven member.

The shell may be and preferably is filled with oil or other liquid, the latter introducing drag to the oscillation of the intermediate member and thus increasing the inertia effect thereof.

In the embodiment of Figure 2, the intermediate member is guided for oscillation with respect to the shell 18 not by projections 15 but by being formed with bevel teeth 19 permanently in mesh with bevel teeth 20 fast with the shell 18.

In the modification of Figure 3 the intermediate member is a built up one comprising a disc or other part 21 with projections 22 journalled in the shell 18, and a ball part 23 journalled on the crank-pin 11 and carrying trunnions 24, 24 (at right-angles to the projections 22) on which the part 21 is mounted.

In the construction of Figure 4 the crank-pin 11, which in this case is parallel to the shaft 13, is engaged in an elongated slot 25 of a bar 26 pivotally supported at its ends by two parallel flywheels 27, 27 fast on a shaft 28 journalled in and extending transversely of a shaft 29 which in this case is the co-axial member aforesaid, the slotted bar and flywheels constituting the intermediate member; and the whole may be enclosed within the casing 30. In the construction of Figure 5 the crank-pin 11 is slidably engaged with the ball 31 which is reciprocal along the slot 25 in the bar 26, the latter being hinged at its ends to arms fast on a flywheel 32 supported from the shaft 29 by the trunnions 33, 33 for oscillation about an axis which is transverse to the axis of the shaft 29 and parallel to the slotted bar. The slotted bar and flywheel together form the intermediate member.

In both Figures 4 and 5, when the shaft 13 is held and the shaft 29 is rotated, the crank-pin works to-and-fro along the slot 25 in the bar, and at the same time the bar and the flywheels 27, or flywheel 32, are oscillated together about the pivotal axis transverse to the shaft 29. When both the driving and driven shafts are rotating in unison there is no oscillation between the crank-pin and the slotted bar or between the flywheel(s) and the shaft 29, the whole rotating in unison.

In the construction of Figure 6, which is a modification of that last described, the ball 31 through which the crank-pin slidably extends is socketed in a hollow cylindrical or other block 34 pivoted at 35 to a ring 36 which is hinged at 37, 37 to the forked end of the shaft 29. In the construction of Figures 4 to 6 the casing 30 may be liquid filled.

By providing means for effecting relative adjustment of the crank-pin 11 and the intermediate member 14, the amplitude of the oscillation of the intermediate member relatively to the shaft 29 can be varied and thus a manual control can be superimposed on the automatic control.

For this purpose Figure 5 shows the crank 12 as having a sliding splined connection with the shaft 13, being slidable, by the control 38, relatively to the intermediate member to vary the amplitude of the oscillatory movements of the ball 31 and thus of the flywheel 32. In like manner, movement of the crank 12 along the shaft 13 in the construction of Figure 6, causing the crank-pin to slide further into, or out of, the block 34, varies the angle of tilt, and thus the amplitude of the movements, of the block. The control 38, however, need not be actuated manually, but may be actuated responsively to the torque or speed of the driving engine or to some other characteristic.

The embodiment shown in Figure 7 is a modification of that illustrated in Figures 1 to 3, the intermediate member 14 (though illustrated as being a disc, may, of course, be of spherical or other form) having peripheral teeth 39 in mesh with teeth or pegs 40 carried by the shell 18, such that the intermediate member can partake of true swash plate or figure-of-eight motion. This figure also shows an alternative form of independent control which may be manually effected or effected responsively to the engine torque or some other characteristic, as will be well understood, and which includes pistons 41 connected for movement in unison and operating in cylinders 42 communicating by the passages 43 with the interior of the shell 18. The pistons when withdrawn will reduce the density of the liquid in or the content of the casing 18, and thus reduce the gyroscopic and inertia forces. Alternatively, use may be made of two fluids, i. e., the back of the pistons, instead of containing air, may contain a different fluid from that in the main portion of the casing 18, and in this connection I particularly have in mind the use of oil and mercury, respectively. Any number of pistons may be used and it will be evident that any of the pistons may be replaced by a diaphragm. 44 indicates light fluid or air passages.

In all the above examples a variable speed reduction is obtained by the inertia of the intermediate member, and in some cases the inertia effect will be reinforced by centrifugal or gyroscopic forces. In addition a manual control may be superimposed when required.

It will be evident that two or more of the mechanisms can be arranged in series or tandem if desired. Thus, with regard to the construction of Figure 1, for example, use could be made of two crank-pins fast on the shaft 13 and disposed at different angles so that while one of the intermediate members was at the end of its stroke the other would be substantially in the middle of its stroke, both intermediate members coacting with different parts of a common shell 18 fast on the shaft 29.

What I claim as my invention and desire to secure by Letters Patent of the United States is:

1. Change-speed gearing comprising in combination a driving shaft, a driven shaft carrying an inclined crankpin, an oscillatable member rotatably mounted on said crankpin, a closed casing drivingly connected to said driving shaft and enclosing said oscillatable member, and a body of liquid filling said casing to increase the inertia effect of said oscillatable member, said casing having slots in which said oscillatable member works when said shafts are rotated relatively to one another.

2. Change-speed gearing comprising in combination a driving shaft, a driven shaft carrying an inclined crankpin, an oscillatable disc rotatably mounted on said crankpin, a closed casing drivingly connected to said driving shaft and enclosing said oscillatable disc, and a body of liquid filling said casing to increase the inertia effect of said oscillatable disc, said casing having a trunnion engagement with said oscillatable disc whereby the latter is rotated upon said crankpin when said driving shaft is rotated relatively to said driven shaft.

CEDRIC CROSTHWAITE.